(12) United States Patent  
Fukagawa et al.

(10) Patent No.: US 12,463,318 B2  
(45) Date of Patent: Nov. 4, 2025

(54) ELECTRONIC DEVICE (71) Applicant: Panasonic Intellectual Property Management Co., Ltd., Osaka (JP)

(72) Inventors: Riho Fukagawa, Osaka (JP); Junichi Hasegawa, Osaka (JP); Junpei Kohara, Osaka (JP); Hiroki Kamezaki, Osaka (JP); Koki Yamamoto, Osaka (JP); Kyota Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 187 days.

(21) Appl. No.: 18/231,813

(22) Filed: Aug. 9, 2023

(65) Prior Publication Data

US 2023/0387571 A1   Nov. 30, 2023

Related U.S. Application Data

(63) Continuation of application No. PCT/JP2022/002321, filed on Jan. 24, 2022.

(30) Foreign Application Priority Data

Feb. 26, 2021  (JP) ................. 2021-029941

(51) Int. Cl.  
*H01Q 1/22* (2006.01)  
*G06F 1/16* (2006.01)  
*H01Q 1/38* (2006.01)

(52) U.S. Cl.  
CPC ......... *H01Q 1/2266* (2013.01); *G06F 1/1698* (2013.01); *H01Q 1/38* (2013.01)

(58) Field of Classification Search  
CPC ...... G06F 1/1616; G06F 1/1698; G06F 1/203; H01Q 1/02; H01Q 1/2266; H01Q 1/2291; H01Q 1/38; H05K 5/02  
See application file for complete search history.

(56) References Cited

U.S. PATENT DOCUMENTS 6,062,145 A * 5/2000 Lin ................. B60N 3/005  
                                           108/44  
2008/0297422 A1* 12/2008 Ishida .............. H01Q 1/38  
                                           343/702

(Continued)

FOREIGN PATENT DOCUMENTS

JP     2012-003624 A    1/2012  
JP     2018-182651 A    11/2018

(Continued)

OTHER PUBLICATIONS

International Search Report for corresponding Application No. PCT/JP2022/002321, mailed Apr. 5, 2022.

*Primary Examiner* — Thien M Le (74) *Attorney, Agent, or Firm* — Renner, Otto, Boisselle & Sklar, LLP (57) ABSTRACT

An electronic device includes a first housing including a display unit, and a second housing that includes an input unit and an antenna unit, is rotatably connected to the first housing via a connection part, and is made of a metal material. The first housing includes a support plate that constitutes a back surface of the first housing, supports the display, and is made of a metal material, and a communication path member that is provided on the support plate and is made of a resin material. The communication path member is disposed in a region facing at least a part of the antenna unit of the second housing in a closed state where the first housing and the second housing are disposed to face each other.

10 Claims, 6 Drawing Sheets

(56) References Cited

U.S. PATENT DOCUMENTS

| | | | |
|---|---|---|---|
| 2009/0262023 A1* | 10/2009 | Ying | H01Q 1/38 |
| | | | 343/700 MS |
| 2010/0073245 A1* | 3/2010 | Namba | H04B 15/00 |
| | | | 343/702 |
| 2011/0310572 A1 | 12/2011 | Murakami | |
| 2012/0275126 A1 | 11/2012 | Murakami | |
| 2018/0309185 A1 | 10/2018 | Akiyama et al. | |
| 2019/0235586 A1 | 8/2019 | Tani et al. | |
| 2019/0237861 A1* | 8/2019 | Kim | H01Q 1/2283 |
| 2020/0025969 A1* | 1/2020 | Jordan | G01V 5/281 |
| 2020/0099121 A1 | 3/2020 | Hirota et al. | |
| 2020/0099129 A1 | 3/2020 | Suzuki et al. | |
| 2020/0243947 A1* | 7/2020 | Yamamoto | H01Q 1/526 |
| 2021/0255357 A1* | 8/2021 | Fonts | G01S 7/025 |
| 2023/0184295 A1* | 6/2023 | Gecim | F16H 3/0915 |
| | | | 403/345 |
| 2023/0333244 A1* | 10/2023 | Fonts | G01S 7/414 |

FOREIGN PATENT DOCUMENTS

| | | |
|---|---|---|
| JP | 2020-047891 A | 3/2020 |
| JP | 2020-048106 A | 3/2020 |
| JP | 2020-109549 A | 7/2020 |
| JP | 2020-120298 A | 8/2020 |
| WO | 2018/123119 A1 | 7/2018 |

* cited by examiner

ELECTRONIC DEVICE

BACKGROUND

1. Technical Field

The present disclosure relates to an electronic device.

2. Description of the Related Art

Patent Literature (PTL) 1 discloses an electronic device in which antenna elements are housed at both ends of one side of a base housing to which an LCD housing is rotatably connected.

PTL 2 discloses an electronic device in which an antenna module is disposed in an antenna section provided in a body housing to which a display housing is rotatably connected.

PTL 1 is Unexamined Japanese Patent Publication No. 2020-48106. PTL 2 is Unexamined Japanese Patent Publication No. 2020-120298.

SUMMARY

However, the electronic devices described in PTLs 1 and 2 have room for improvement in terms of improving communication characteristics.

An object of the present disclosure is to provide an electronic device capable of improving communication characteristics.

An electronic device according to one aspect of the present disclosure includes: a first housing including a display; and a second housing that includes an input unit and an antenna unit, is rotatably connected to the first housing via a connection part, and is made of a metal material. The first housing includes a support plate that constitutes a back surface of the first housing, supports the display, and is made of a metal material, and a communication path member that is provided on the support plate and is made of a resin material. The communication path member is disposed in a region facing at least a part of the antenna unit of the second housing in a closed state where the first housing and the second housing are disposed to face each other.

According to the present disclosure, communication characteristics can be improved.

DETAILED DESCRIPTION (Background to Present Disclosure)

Examples of electronic device 1 include a notebook computer (laptop PC). A notebook computer includes a first housing having a display, a second housing having an input unit, and a hinge rotatably connecting the first housing and the second housing. At least one of the first housing and the second housing is rotated by the hinge, and the electronic device can be opened and closed. Specifically, the electronic device can be brought into an opened state and a closed state by the hinge. The "opened state" means a state in which the first housing and the second housing are separated from each other and the input unit and the display are exposed. The "closed state" means a state in which the first housing and the second housing are disposed to face each other, the input unit and the display face each other, and the input unit and the display are not exposed.

An electronic device of such a notebook computer is provided with an antenna unit for use in a communication environment of Wi-Fi (registered trademark) or Bluetooth (registered trademark).

Furthermore, in recent years, remote work has become increasingly popular. Remote work refers to the performance of work by employees in locations other than their offices. For example, in a case where a user performs work at home using a notebook computer (electronic device), a display or keyboard prepared separately may be connected to the electronic device and used instead of a keyboard or a liquid crystal display (LCD) mounted on the electronic device. In addition, the electronic device may be used simply as a repeater. In such a case, the user may use the electronic device in a "closed state".

However, when the electronic device is used in the closed state, the antenna unit is surrounded by the first housing and the second housing. When the first housing and the second housing are formed of a metal material, there is a problem in that communication of the antenna unit is hindered by the first housing and the second housing, and quality of wireless communication is deteriorated.

Therefore, the present inventors have developed an electronic device capable of suppressing deterioration in quality of wireless communication even when the electronic device is in a closed state.

An electronic device according to a first aspect of the present disclosure includes:

a first housing including a display; and a second housing that includes an input unit and an antenna unit, is rotatably connected to the first housing via a connection part, and is made of a metal material. The first housing includes a support plate that constitutes a back surface of the first housing, supports the display, and is made of a metal material, and a communication path member that is provided on the support plate and is made of a resin material. The communication path member is disposed in a region facing at least a part of the antenna unit of the second housing in a closed state where the first housing and the second housing are disposed to face each other.

With this configuration, even in a state where the electronic device is closed, deterioration of communication characteristics can be suppressed, and communication characteristics can be improved.

In the electronic device according to a second aspect of the present disclosure, the antenna unit may be disposed near the connection part.

With this configuration, the antenna unit can be disposed away from the user.

In the electronic device according to a third aspect of the present disclosure, the antenna unit includes a substrate on which a wiring pattern is formed, and the communication path member may be disposed at a position facing at least a part of the wiring pattern.

With this configuration, communication characteristics can be further improved.

In the electronic device according to a fourth aspect of the present disclosure, in the closed state, the communication path member may be disposed to be displaced outward from the substrate as viewed in a thickness direction of the electronic device.

With this configuration, the radio wave output from the antenna unit is easily emitted to the outside of the electronic device via the communication path member. In addition, a radio wave from the outside of the electronic device is likely to enter the antenna unit via the communication path member. Accordingly, communication characteristics can be further improved.

In the electronic device according to a fifth aspect of the present disclosure, the antenna unit may include a plurality of substrates, and the first housing may include a plurality of communication path members.

With this configuration, communication characteristics can be further improved.

In the electronic device according to a sixth aspect of the present disclosure, the communication path member may include an anchor member engaged with the support plate.

With this configuration, the anchor member can prevent the communication path member from falling off from the first housing.

In the electronic device according to a seventh aspect of the present disclosure, the support plate includes a cutout part in which the communication path member is provided in a region facing at least a part of the antenna unit, the cutout part is formed of a cutout plate defining a cutout, the cutout plate has a through hole having hole dimension that increases from an outer surface toward an inner surface of the support plate, and the anchor member includes a first anchor protruding from an inner surface of the communication path member toward the cutout plate and disposed in the through hole.

With this configuration, the first anchor can more reliably prevent the communication path member from falling off from the first housing.

In the electronic device according to an eighth aspect of the present disclosure, a peripheral wall of the support plate may include a fixing recess that is depressed toward an inside of the support plate at a portion connected to the cutout part, a dimension of the fixing recess may increase in a direction along which the peripheral wall extends and away from the cutout part, the anchor member may include a second anchor that protrudes from a side wall of the communication path member in a direction along which the side wall extends, and is disposed in the fixing recess, and an outer dimension of the second anchor may increase in a direction along which the second anchor protrudes.

With this configuration, the second anchor can more reliably prevent the communication path member from falling off from the first housing.

In the electronic device according to a ninth aspect of the present disclosure, the support plate may be made of a Mg alloy, and the communication path member may be made of a polyamide resin or a polycarbonate resin.

With this configuration, adhesion between the support plate and the communication path member can be improved.

In the electronic device according to a tenth aspect of the present disclosure, the second housing may include an exhaust port for communicating an inside and an outside of the second housing, and includes an exhaust structure component made of a resin material, and the antenna unit may be disposed in the exhaust structure component.

With this configuration, the antenna unit can be mounted using the exhaust structure component.

EXEMPLARY EMBODIMENTS

[General Configuration]

Figure 1:
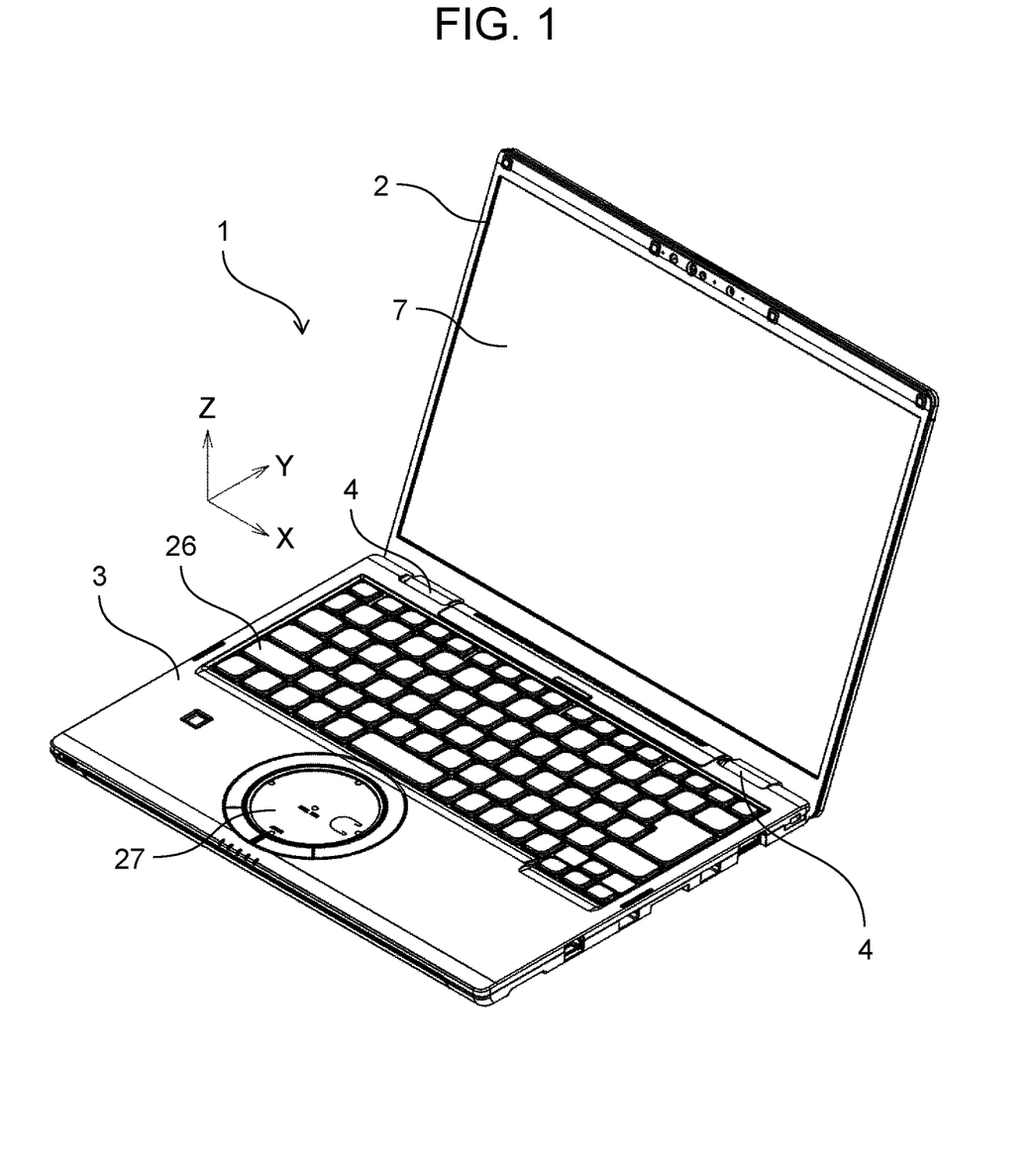
FIG. 1 is a perspective view illustrating an example of an electronic device according to an exemplary embodiment of the present disclosure.

FIG. 1 is a schematic perspective view illustrating an example (notebook computer) of electronic device 1 according to an exemplary embodiment of the present disclosure. In the drawing, X, Y, and Z directions respectively indicate a width direction, a depth direction, and a height direction of electronic device 1.

Electronic device 1 includes first housing 2 and second housing 3. First housing 2 and second housing 3 are rotatably connected via a pair of hinges 4 provided as connection parts. First housing 2 rotates with respect to second housing 3 about hinges 4. Accordingly, electronic device 1 can be brought into an opened state and a closed state.

[First Housing]

Figure 2:
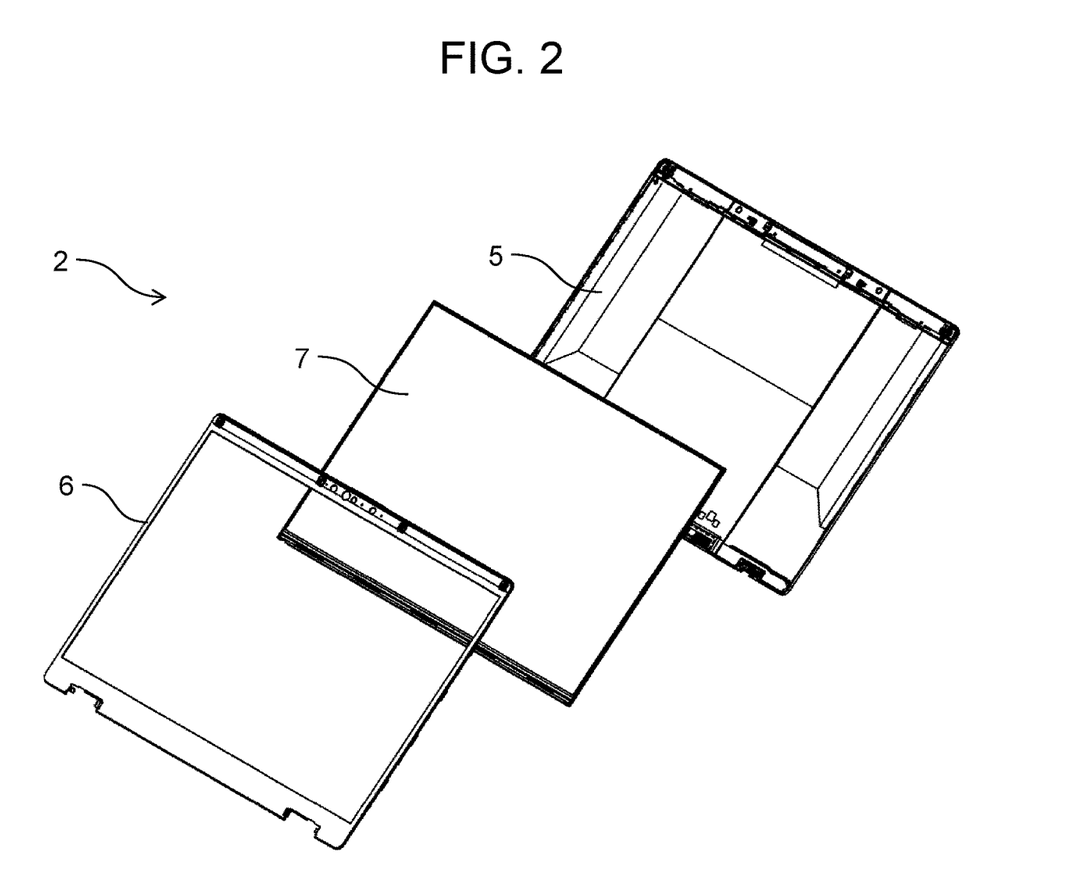
FIG. 2 is an exploded perspective view of a first housing of the electronic device illustrated in FIG. 1.

As illustrated in the exploded perspective view of FIG. 2, first housing 2 includes support plate 5, support frame 6, and display 7. Support plate 5 is made of a metal material (for example, an alloy). Support plate 5 is located on a back surface side of first housing 2 and constitutes a back surface of first housing 2 and supports display 7. Support plate 5 has, for example, a rectangular shape in plan view. Support frame 6 is located on a front surface side of first housing 2 and constitutes a front surface of first housing 2 and is attached to support plate 5. Support frame 6 has, for example, a rectangular frame shape in plan view. Support frame 6 is made of a resin material (for example, polycarbonate resin).

First housing 2 is provided with display 7. Display 7 is, for example, a liquid crystal panel. Display 7 is housed in a space formed by support plate 5 and support frame 6. A front surface of display 7 is exposed from support frame 6, and a back surface of display 7 is covered with support plate 5.

Figure 3:
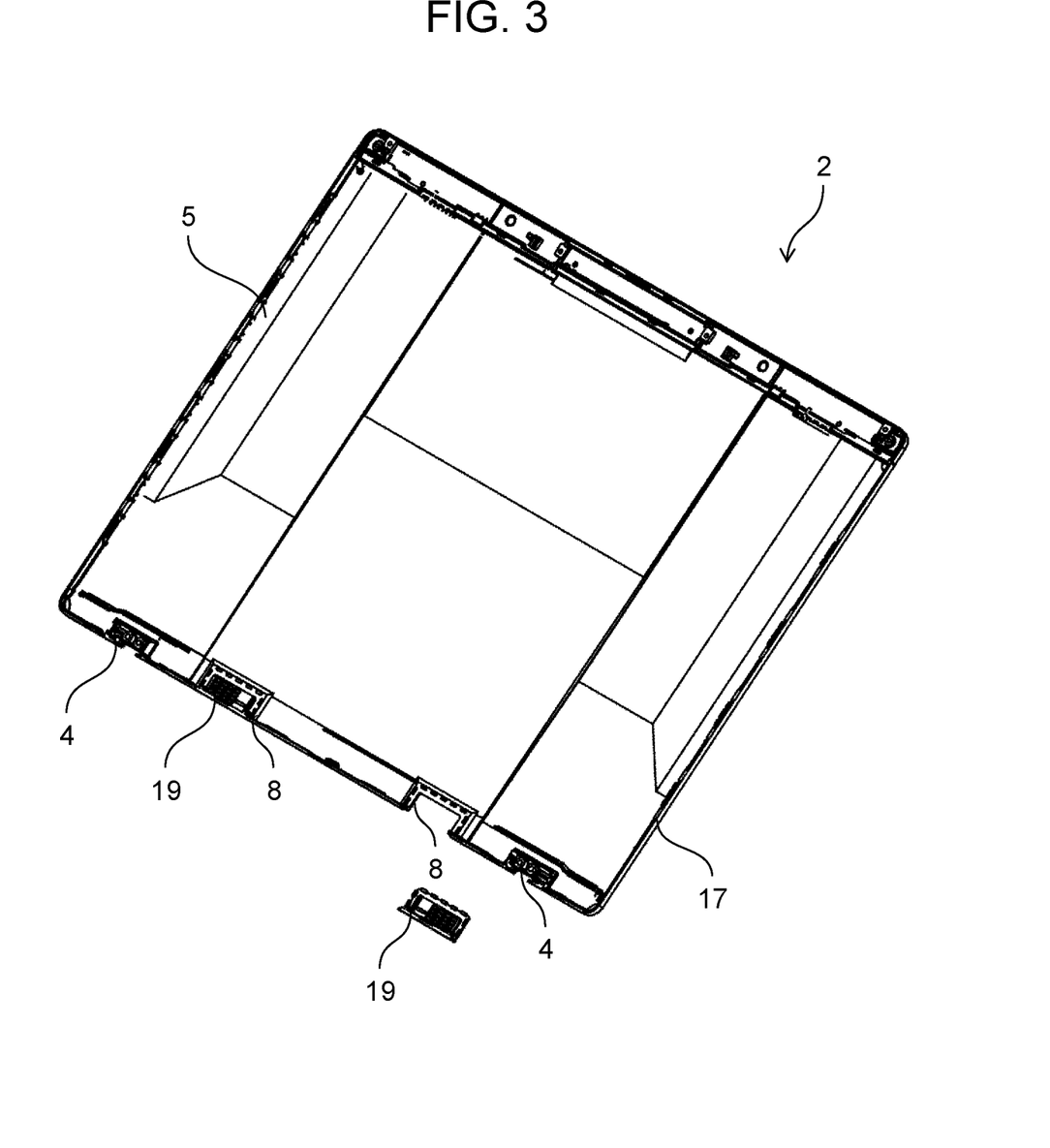
FIG. 3 is a perspective view of a support plate of the first housing illustrated in FIG. 2.

As illustrated in FIG. 3, support plate 5 has peripheral wall 17 provided along an outer edge of support plate 5 in plan view. Peripheral wall 17 protrudes from an inner surface of support plate 5 toward support frame 6. At two intermediate portions of peripheral wall 17, cutout part 8 is correspondingly formed near the inner side in the width direction with respect to each hinge 4. Cutout part 8 is provided in a region facing at least a part of antenna unit 28 of second housing 3 to be described later in a closed state in which first housing 2 and second housing 3 are disposed to face each other (see FIG. 8).

Figure 4:
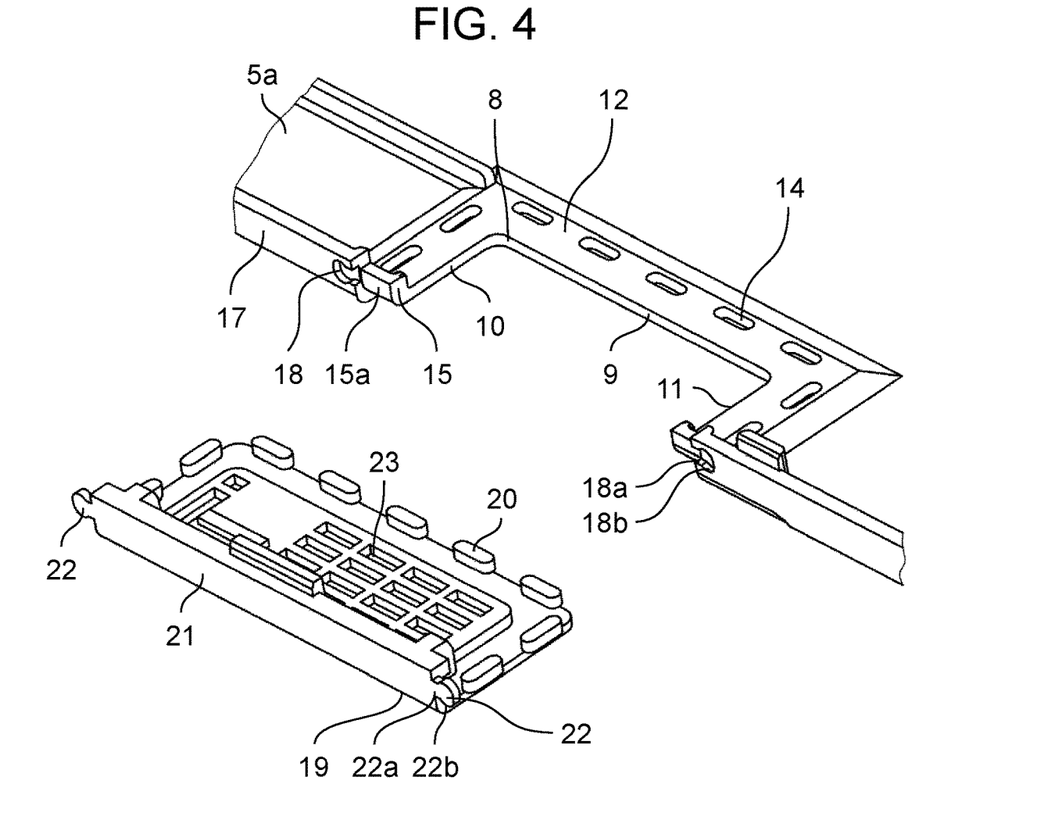
FIG. 4 is a partially enlarged view of the support plate illustrated in FIG. 3.

As shown in FIG. 4, each cutout part 8 is constituted by cutout plate 12 defining a cutout. Cutout plate 12 is formed in a substantially U shape in plan view. Cutout plate 12 forms a cutout in a region defined by first edge 9 parallel to the lower edge of support plate and second edge 10 and third edge 11 extending from both ends of first edge 9 toward the lower edge.

Figure 5:
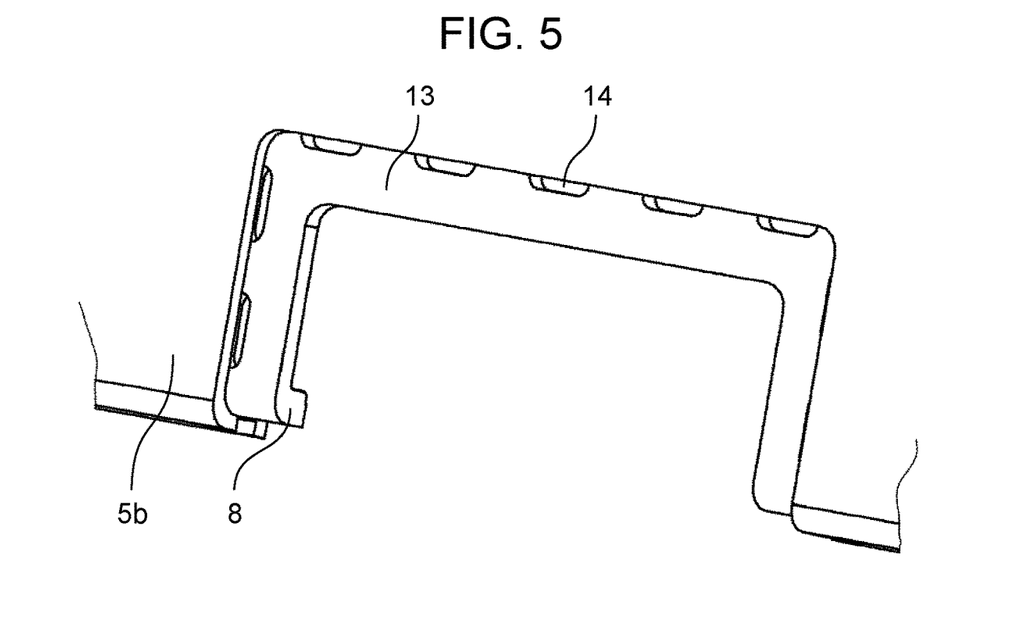
FIG. 5 is a perspective view illustrating a cutout part of the support plate illustrated in FIG. 4 as viewed from the opposite side.

Cutout plate 12 protrudes toward first surface 5a (inner surface) of support plate 5 and is provided at a position depressed from second surface 5b (outer surface) of support plate 5. As a result, as illustrated in FIG. 5, depression 13 is formed at the position where cutout plate 12 is provided when viewed from the second surface 5b side of support plate 5. Depression 13 prevents a defect such as sink from occurring after molding by preventing the thickness of cutout plate 12 from becoming too large.

Referring back to FIG. 4, a plurality of through holes 14 penetrating the front and back surfaces of cutout plate 12 are formed in cutout plate 12 along first edge 9, second edge 10, and third edge 11. The plurality of through holes 14 have a hole dimension (opening area) increasing from second surface 5b toward first surface 5a of the support plate. Each through hole 14 is, for example, a long hole. Specifically, in through hole 14, the opening area of the opening on the first surface 5a side is larger than the opening area of the opening on the second surface 5b side. In the present exemplary embodiment, each through hole 14 is completely opened on the first surface 5a side, and is opened in depression 13 by a half divided along the longitudinal direction on the second surface 5b side (see FIG. 5). In through hole 14, first anchor 20 of communication path member 19 described later is disposed.

End wall 15 bent at a right angle is formed at a lower end of cutout plate 12. End wall 15 is formed by bending a portion of cutout plate 12 connected to peripheral wall 17 in the thickness direction of cutout plate 12. In plan view, end wall 15 is disposed inside support plate 5 with respect to peripheral wall 17. Thus, step 15a is formed on end wall 15. In peripheral wall 17, fixing recess 18 recessed toward the inside of support plate 5 is formed at a portion connected to cutout part 8. Fixing recess 18 is open toward step 15a. The dimension of fixing recess 18 increases in the direction along which peripheral wall 17 extends and away from cutout part 8. Specifically, fixing recess 18 includes rectangular recess 18a having the same width dimension from the step 15a side, and circular recess 18b converging after the width dimension increases.

Communication path member 19 made of a resin material is disposed in cutout part 8. The communication path member 19 is a member serving as a path through which radio waves pass. Specifically, when electronic device 1 is in the closed state, communication path member 19 becomes a path, which will be described later, through which a radio wave from antenna unit 28 to the external device and a radio wave from the external device to antenna unit 28 pass.

Communication path member 19 is obtained by, for example, insert molding on support plate 5, and can have, for example, a rectangular plate shape in plan view. For example, a synthetic resin material containing a polyamide resin or a polycarbonate resin can be used for communication path member 19. Such a synthetic resin material is excellent in antenna characteristics (in particular, radio wave transparency), and has high adhesion strength to, for example, a Mg (Magnesium) alloy that is a constituent material of first housing 2.

Communication path member 19 has first anchor 20 that protrudes from the inner surface of communication path member 19 toward cutout plate 12 and is disposed in through hole 14. First anchor 20 contacts an inner wall defining through hole 14. First anchor 20 is formed when communication path member 19 is insert-molded. That is, during the insert molding, the resin is filled in the entire through hole 14 from the back surface side of support plate 5. In through hole 14, the opening on the second surface 5b side of support plate 5 is smaller than the opening on the first surface 5a side of support plate 5. Due to this difference in opening shape, first anchor 20 is engaged with cutout plate 12. Specifically, first anchor 20 is disposed in through hole 14 in contact with an inner wall defining through hole 14. As a result, first anchor 20 is fixed to cutout plate 12 in a state of being fitted in through hole 14. As a result, communication path member 19 is less likely to fall off from support plate 5.

Communication path member 19 has side wall 21 that is supported by end wall 15, is located at step 15a, and is continuous with peripheral wall 17. Side wall 21 extends in the direction along which peripheral wall 17 extends. Communication path member 19 protrudes from side wall 21 in a direction along which side wall 21 extends, and includes second anchor 22 disposed in fixing recess 18. Specifically, both ends of side wall 21 are located in steps 15a, and second anchors 22 are provided at both ends of side wall 21. Second anchor 22 protrudes from step 15a toward fixing recess 18 of peripheral wall 17. The outer dimension of second anchor 22 increases in the direction along which second anchor 22 protrudes. Specifically, second anchor 22 includes rectangular protrusion 22a having the same width dimension and circular protrusion 22b that converges after the width dimension increases. Rectangular protrusion 22a is disposed in rectangular recess 18a, and circular protrusion 22b is disposed in circular recess 18b. Side wall 21 of communication path member 19 and peripheral wall 17 are continuous without a step.

Similarly to first anchor 20, second anchor 22 is formed when communication path member 19 is insert-molded. That is, during the insert molding, the resin is filled from rectangular recess 18a to circular recess 18b. Due to the difference in shape between rectangular recess 18a and circular recess 18b, second anchor 22 has a structure in which the width dimension of circular protrusion 22b is larger than the width dimension of rectangular protrusion 22a. As a result, second anchor 22 is engaged with peripheral wall 17. Specifically, second anchor 22 is disposed in fixing recess 18 in contact with the inner wall defining fixing recess 18. As a result, second anchor 22 is fixed to peripheral wall 17 in a state of being fitted in fixing recess 18. As a result, communication path member 19 is less likely to fall off from support plate 5.

In the present description, first anchor 20 and second anchor 22 may be referred to as anchor members.

A plurality of escape recesses 23 are formed in a lattice shape in a central portion of the inner surface of communication path member 19. The plurality of escape recesses 23 prevent a portion having an excessively large wall thickness from being formed in communication path member 19, and thus prevents deformation or the like of communication path member 19 after insert molding.

[Second Housing]

Figure 6:
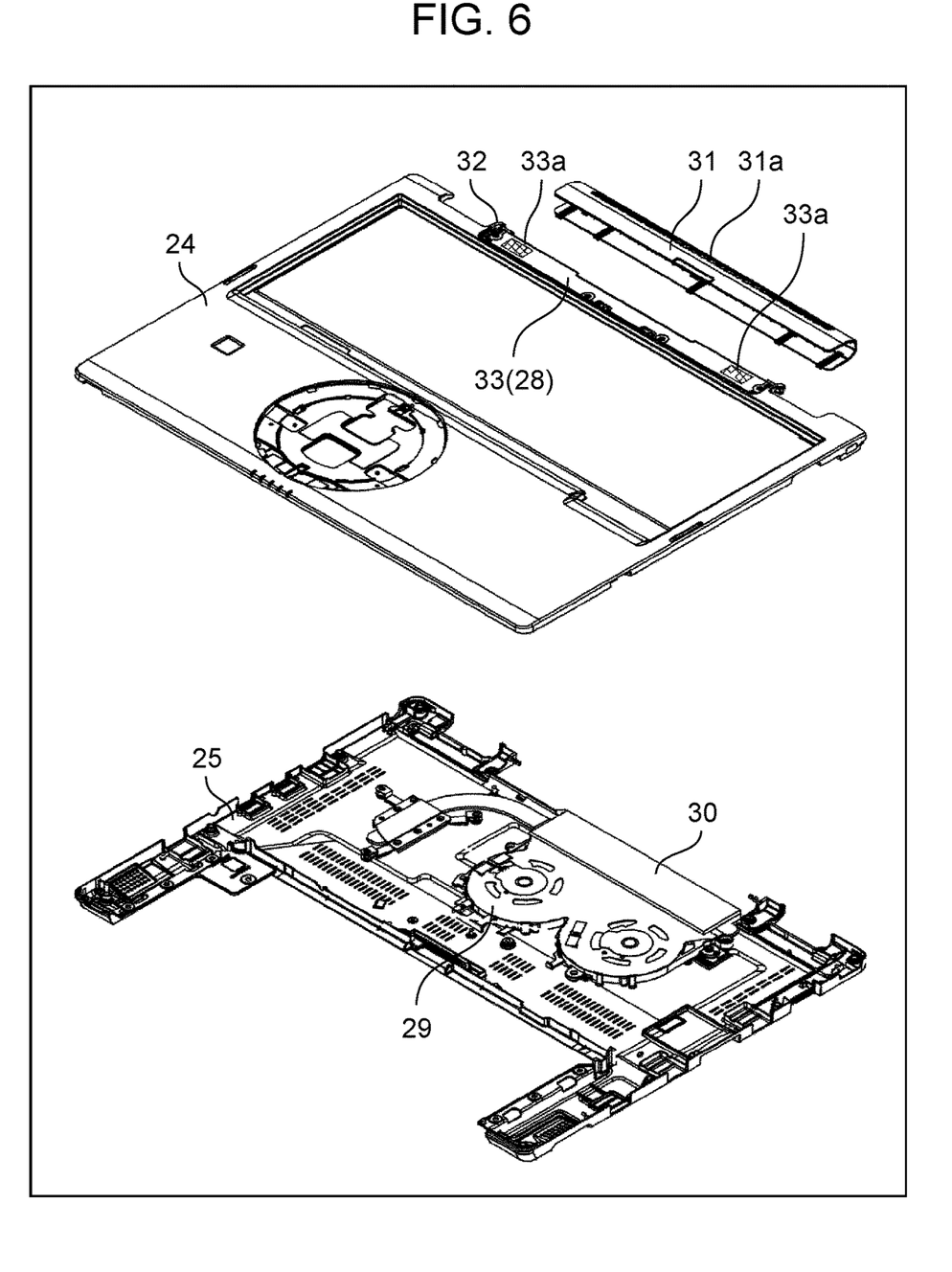
FIG. 6 is an exploded perspective view of a second housing of the electronic device illustrated in FIG. 1.

Second housing 3 is rotatably connected to first housing 2 via hinge 4. Second housing 3 is made of a metal material (for example, a Mg alloy). As illustrated in FIG. 6, second housing 3 includes top panel 24 and bottom panel 25. Top panel 24 is provided with keyboard 26, touch pad 27, antenna unit 28, and the like (see FIG. 1). Cooling fan 29 and the like are housed in an internal space formed by top panel 24 and bottom panel 25.

Note that, in the present description, keyboard 26 and touch pad 27 may be referred to as input units.

Antenna unit 28 inputs and outputs a radio wave for performing wireless communication with an external device based on a predetermined communication standard in electronic device 1. The predetermined communication standard includes, for example, Wi-Fi (registered trademark), Bluetooth (registered trademark), and the like. Antenna unit 28 includes substrate 33 on which wiring pattern 33a is formed. Various electronic components are mounted on substrate 33, and wiring patterns 33a serving as antennas are formed at both ends of the top surface. Wiring pattern 33a is made of, for example, a material having conductivity, and can communicate with the outside. Here, a 5G antenna is adopted as antenna unit 28.

Figure 7:
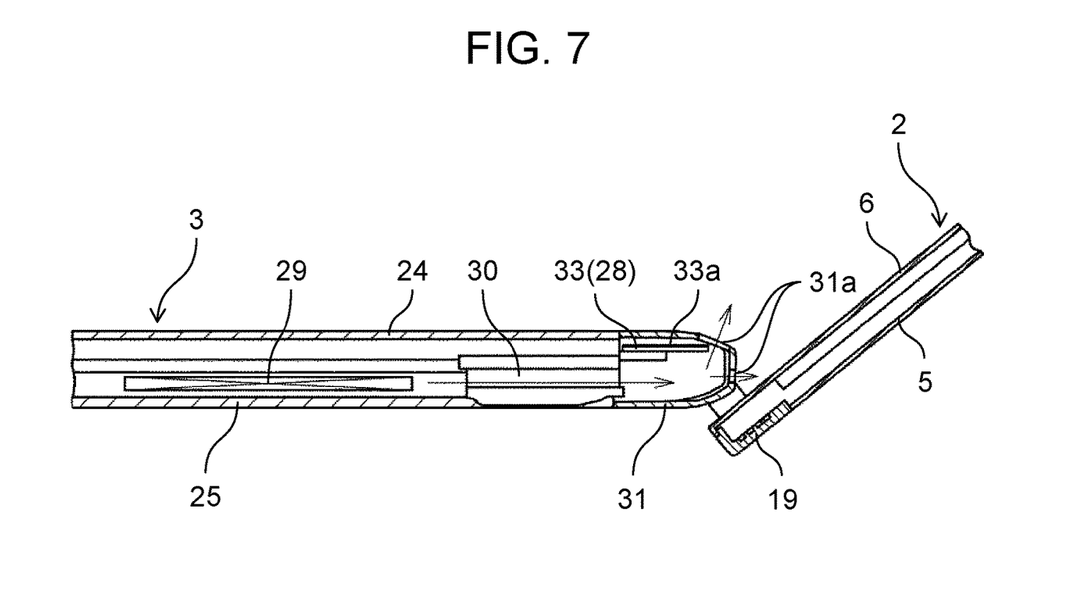
FIG. 7 is a cross-sectional view illustrating a part including a connection part of the electronic device illustrated in FIG. 1.
Figure 8:
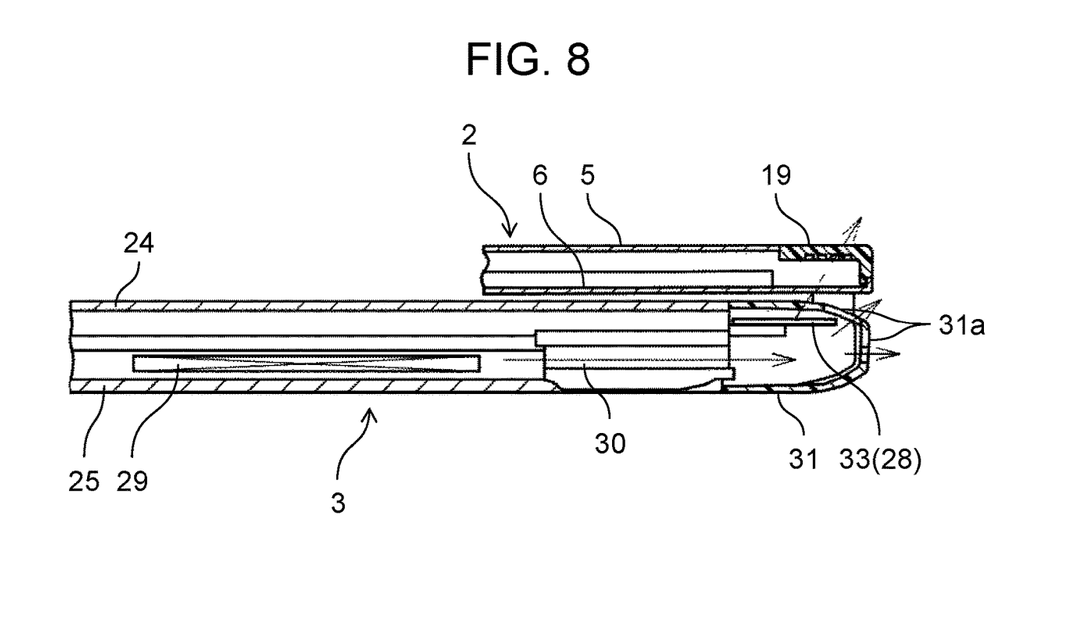
FIG. 8 is a cross-sectional view illustrating a closed state of the electronic device illustrated in FIG. 7.

As illustrated in FIGS. 7 and 8, antenna unit 28 is provided near hinge 4 of second housing 3. In the present exemplary embodiment, antenna unit 28 is disposed between two hinges 4 of second housing 3 in plan view. At least a part of antenna unit 28 faces communication path member 19 of first housing 2 in a closed state in which first housing 2 and second housing 3 are disposed to face each other.

When viewed in the thickness direction (Z direction) of electronic device 1, communication path member 19 is disposed to be displaced outward from antenna unit 28, toward the depth direction side with respect to wiring pattern 33a in plan view. As described above, communication path member 19 is provided to be displaced in a portion obliquely upward with respect to wiring pattern 33a of antenna unit 28. Consequently, the radio wave output from wiring pattern 33a of antenna unit 28 toward the external device is easily output to the outside of electronic device 1 (indicated by a two-dot chain line arrow in FIG. 8). In addition, a radio wave input from an external device to wiring pattern 33a of antenna unit 28 is also easily input to wiring pattern 33a.

As illustrated in FIG. 7, heat dissipation fin 30 is disposed on the downstream side of cooling fan 29 in the air blowing direction. In the present exemplary embodiment, the downstream side of cooling fan 29 in the air blowing direction is the side on which hinge 4 is provided. Louver 31 made of a resin material is disposed as an exhaust structure component on the further downstream side of heat dissipation fin 30. Louver 31 has a substantially U-shaped cross section, and a plurality of slit-shaped exhaust ports 31a are formed at predetermined intervals in the width direction. Exhaust port 31a allows the inside and the outside of second housing 3 to communicate with each other. Louver 31 is disposed at cut portion 32 between hinges 4 formed on top panel 24. Antenna unit 28 is disposed in a space surrounded by louver 31. Substrate 33 is screwed to an edge constituting cut portion 32. In this screwed state, substrate 33 is located in an upper portion of the space surrounded by louvers 31 and does not obstruct the flow of air from the cooling fan. Furthermore, by making substrate 33 follow the flow of air, a favorable flow state can be secured, and substrate 33 can also be appropriately cooled.

Effects

According to electronic device 1 having the above configuration, the following effects can be obtained.

(1) Even when electronic device 1 including first housing 2 and second housing 3 is in the closed state, the radio wave of antenna unit 28 can be input and output via communication path member 19 made of a resin material provided in first housing 2. Therefore, it is possible to prevent the wireless communication of antenna unit 28 from being hindered by first housing 2 and second housing 3, and it is possible to suppress deterioration of communication characteristics.

As a result, communication characteristics can be improved.

(2) Since antenna unit 28 is provided in second housing 3, a space for disposing antenna unit 28 in first housing 2 is unnecessary, and the width of support frame 6 can be reduced. Thus, the area occupied by display 7 in first housing 2 can be increased.

(3) The communication path member 19 can be integrally formed with first housing 2 by insert molding. In addition, anchor member is formed in communication path member 19 to increase the attachment strength with first housing 2. In addition, a polyamide resin or a polycarbonate resin is used as the resin material used for communication path member 19, and thus the adhesion strength with the metal material (Mg alloy) constituting first housing 2 is excellent. Therefore, the attachment state of communication path member 19 to first housing 2 can be strengthened.

(4) Antenna unit 28 can be attached to top panel 24 of second housing 3. Therefore, it is possible to suppress an increase in the number of components and to achieve a compact configuration.

(5) Antenna unit 28 is disposed in louver 31 (an exhaust structure component) that is a blowing path from cooling fan 29. This allows for effective cooling of antenna unit 28 adopting a 5G antenna that particularly has a problem of heat generation.

(6) Antenna unit 28 is disposed in louver 31 along a flow of air from cooling fan 29. Therefore, the air can be smoothly discharged to the outside of second housing 3 without hindering the flow of the air.

OTHER EXEMPLARY EMBODIMENTS

In the above exemplary embodiment, the example in which the wiring patterns are formed at both ends of the substrate constituting antenna unit 28 has been described, but the number of wiring patterns 33a is not limited to two, and may be only one or three or more. In this case, communication path member 19 may be provided at a position corresponding to each wiring pattern 33a. In this case, similarly to the above, communication path member 19 is preferably provided at a position displaced toward the depth direction side with respect to wiring pattern 33a at the closed position.

In the above exemplary embodiment, an example in which antenna unit 28 includes one substrate 33 has been described, but the present invention is not limited thereto. Antenna unit 28 may have a plurality of substrates 33. In this case, in a state where electronic device 1 is closed, a plurality of cutout parts 8 may be provided in first housing 2 in a region facing at least a part of each wiring pattern 33a of the plurality of substrates 33. The second housing may have a plurality of communication path members 19 disposed in the plurality of cutout parts 8.

Although the present disclosure has been fully described in connection with preferable exemplary embodiments with reference to the accompanying drawings, various modifications and changes are obvious to those skilled in the art. It should be understood that, as long as such modifications and corrections do not deviate from the scope of the present disclosure according to the appended claims, such modifications and corrections are included therein.

The present disclosure is useful for various electronic devices including a notebook computer on which an antenna is mounted.

What is claimed is:
1. An electronic device comprising:
a first housing including a display; and
a second housing that includes an input unit and an antenna unit, is rotatably connected to the first housing via a connection part, and is made of a metal material, wherein the first housing includes
- a support plate that constitutes a back surface of the first housing, supports the display, and is made of a metal material, and
- at least one communication path member that is provided on the support plate and is made of a resin material, and the at least one communication path member is disposed in a region facing at least a part of the antenna unit of the second housing in a closed state where the first housing and the second housing are disposed to face each other.

2. The electronic device according to claim 1, wherein the antenna unit is disposed near the connection part.

3. The electronic device according to claim 1, wherein
the antenna unit includes at least one substrate on which a wiring pattern is formed, and
the at least one communication path member is disposed at a position facing at least a part of the wiring pattern.

4. The electronic device according to claim 3, wherein in the closed state, the at least one communication path member is disposed to be displaced outward from the at least one substrate as viewed in a thickness direction of the electronic device.

5. The electronic device according to claim 3, wherein
the at least one substrate is a plurality of substrates, and
the at least one communication path member is a plurality of communication path members.

6. The electronic device according to claim 1, wherein the at least one communication path member includes an anchor member that engages with the support plate.

7. The electronic device according to claim 6, wherein
the support plate includes a cutout part in which the at least one communication path member is disposed in a region facing at least a part of the antenna unit,
the cutout part is formed of a cutout plate defining a cutout,
the cutout plate has a through hole having hole dimension that increases from an outer surface toward an inner surface of the support plate, and
the anchor member includes a first anchor protruding from an inner surface of the at least one communication path member toward the cutout plate and disposed in the through hole.

8. The electronic device according to claim 7, wherein
a peripheral wall of the support plate includes a fixing recess that is depressed toward an inside of the support plate at a portion connected to the cutout part,
a dimension of the fixing recess increases in a direction along which the peripheral wall extends and away from the cutout part,
the anchor member includes a second anchor that protrudes from a side wall of the at least one communication path member in a direction along which the side wall extends, and is disposed in the fixing recess, and
an outer dimension of the second anchor increase in a direction along which the second anchor protrudes.

9. The electronic device according to claim 1, wherein
the support plate is made of a Mg alloy, and
the at least one communication path member is made of a polyamide resin or a polycarbonate resin.

10. The electronic device according to claim 1, wherein
the second housing includes an exhaust port for communicating an inside and an outside of the second housing, and includes an exhaust structure component made of a resin material, and
the antenna unit is disposed in the exhaust structure component.

* * * * *